(12) United States Patent
Peplow et al.

(10) Patent No.: US 10,342,245 B2
(45) Date of Patent: Jul. 9, 2019

(54) METHOD AND APPARATUS FOR CITRUS JUICE PROCESSING

(71) Applicants: Arthur J. Peplow, Winter Haven, FL (US); Roger Waters, Auburndale, FL (US); Thomas B. Landgraf, Winter Haven, FL (US)

(72) Inventors: Arthur J. Peplow, Winter Haven, FL (US); Roger Waters, Auburndale, FL (US); Thomas B. Landgraf, Winter Haven, FL (US)

(73) Assignee: Brown International Corporation LLC, Winter Haven, FL (US)

( * ) Notice: Subject to any disclaimer, the term of this patent is extended or adjusted under 35 U.S.C. 154(b) by 0 days.

(21) Appl. No.: 15/530,406

(22) Filed: Jan. 9, 2017

(65) Prior Publication Data

US 2017/0202252 A1   Jul. 20, 2017

Related U.S. Application Data

(60) Provisional application No. 62/392,247, filed on May 24, 2016, provisional application No. 62/388,197, filed on Jan. 19, 2016.

(51) Int. Cl.
*A23L 2/00* (2006.01)
*A23L 2/72* (2006.01)
*A23N 1/00* (2006.01)

(52) U.S. Cl.
CPC ............... *A23L 2/72* (2013.01); *A23N 1/003* (2013.01); *A23V 2002/00* (2013.01)

(58) Field of Classification Search
CPC ........ A23N 1/003; A23L 2/72; A23V 2002/00
See application file for complete search history.

(56) References Cited

U.S. PATENT DOCUMENTS

| | | |
|---|---|---|
| 3,370,527 A | 2/1968 | Holbrook |
| 4,518,621 A | 5/1985 | Alexander |
| 4,665,816 A | 5/1987 | Waters et al. |
| 4,871,569 A | 10/1989 | Anderson et al. |
| 4,946,702 A | 8/1990 | Stipp et al. |
| 4,957,630 A | 9/1990 | Bratten |
| 5,651,305 A | 7/1997 | Bushman et al. |
| 2014/0158586 A1* | 6/2014 | Gallagher .............. D21D 5/026 209/235 |

FOREIGN PATENT DOCUMENTS

| | | |
|---|---|---|
| WO | WO1988010335 A1 | 6/1988 |
| WO | WO2009154698 | 12/2009 |

OTHER PUBLICATIONS

PCT search report regarding PCT/US2017/000002, dated May 5, 2017.

* cited by examiner

*Primary Examiner* — Anshu Bhatia
(74) *Attorney, Agent, or Firm* — Bruce H. Johnsonbaugh

(57) ABSTRACT

An improved citrus juice finisher is provided for producing "thin" juice. A first aspect is an improved screen design with small perforations having diverging walls in the direction of juice moving through the screen to prevent "blinding" of the screen by entrained particles. A second aspect is a juice modulator which pulverizes the entrained particles to a desired size and viscosity. A third aspect is an improved multi-vane finisher with increased yield and capacity.

17 Claims, 13 Drawing Sheets

METHOD AND APPARATUS FOR CITRUS JUICE PROCESSING

CROSS REFERENCE TO RELATED APPLICATIONS

This application claims the benefit of and priority from U.S. provisional applications Ser. No 62/388,197 filed Jan. 19, 2016 and Ser. No. 62/392,247 filed May 24, 2016.

BACKGROUND

As the worldwide demand for citrus juice increases, the demand for "thin" citrus juice, in particular orange juice, increases at an even faster rate. The term "thin" as used herein refers to juice having a mean particle size of less than 360 microns (360 µm).

The present techniques for producing "thin" juice typically require either centrifuges, homogenizers or fabric screening devices or a combination of two or more of those techniques. Significant problems are inherent in each of these prior art techniques. The use of centrifuges often results in unacceptable loss of juice yield if the centrifuge is under capacity or is not operated properly. Homogenizers require large amounts of capital, energy costs are high, they impart unwanted increase of temperature to the juice, and are less effective in reducing bottom pulp levels. The use of fabric screens frequently involves torn screens and resultant down time, reduced juice yield and high energy costs.

It is also known in the art to utilize metallic, cylindrically shaped, perforated screens in juice finishers to separate particles as the raw juice is urged through the metallic screen. The problem with this technique is that particles accumulate in the perforations and ultimately block the perforations which results in "blinding" of the screen, resulting in costly down time to back-flush the particles from the screen perforations.

There is a large and growing demand for a cost effective, reliable system for producing "thin" citrus juice.

Most preferably, such an improved system would avoid the requirement of using a centrifuge, a homogenizer, fabric screens and would also prevent "blinding" of any metallic screen.

The present invention solves all the above problems in a cost effective and reliable manner.

SUMMARY OF THE INVENTION

A key aspect of the invention is a novel juice finishing screen design for separating particles which eliminates the problem of screen "blinding." This is accomplished by utilizing small, novel shaped perforations having diverging walls in the direction of travel of raw juice through the screen. The diverging walls prevent the particles from adhering to the sidewalls of the perforations. The perforations preferably have a truncated conical shape.

A related aspect of the invention is the use of a much thicker and stronger screen than known in the art. The thicker screen can be utilized since it incorporates the novel perforations which prevent screen "blinding." The use of the thicker screen eliminates the need of a secondary "support" screen utilized in typical prior art juice finishers. The prior art support screen reduces the flow rate of raw juice through the finishing screen, as shown below.

The invention also provides a system for conditioning, monitoring and modulating the finished juice. This system monitors the viscosity and mean particle size of the finished juice, and further conditions the juice by physically reducing the size of remaining particles in the juice. This system essentially pulverizes particles having a diameter greater than 500 µm to less than 240 µm, as shown and described below. This conditioning and modulating system does not require the use of the improved screen design. It is capable of operating with prior art citrus juice finishers.

The invention also provides an improved multi-vane finisher design. The improved multi-vane finisher optionally includes the novel screen design, and in addition includes an improved rotor design and a pressurized feed mechanism, in contrast to prior art gravity feeding of raw juice into an open inlet section. The improved rotor design provides a reduced pitch, resulting in increased residence time. The pressurized feed system results in a significant increase of juice yield and finishing capacity.

A primary object of the invention is to provide a cost effective system for producing thin citrus juice which eliminates the need to use a centrifuge, a homogenizer or fabric screens in the system.

A further object of the invention is to provide a screen design for use in citrus juice finishers which is perforated with small enough openings to obtain finished juice having entrained solids with mean particle diameters (or size) less than 360 µm, wherein the perforations are shaped to prevent "blinding."

A further object is to provide a juice modulator which physically reduces the mean particle diameters of entrained solids (or particles) to between 240 µm and 280 µm, resulting in a thin citrus juice with substantially smaller particles or solids than known in the prior art, and which may be used with prior art finishers.

Another object is to provide a sensor for measuring viscosity of the finished juice and a control system for maintaining a desired level of viscosity.

Another object is to provide a sensor for measuring particle size of the finished juice and a control system for maintaining a desired particle size.

Another object is to provide an improved multi-vane finisher with a novel pressurized feed system and rotor design for increasing juice yield and capacity beyond that known in the prior art.

Further objects and advantages will become apparent from the drawings and detailed description below.

DETAILED DESCRIPTION OF THE DRAWINGS

Improved Screen Design

Figure 1:
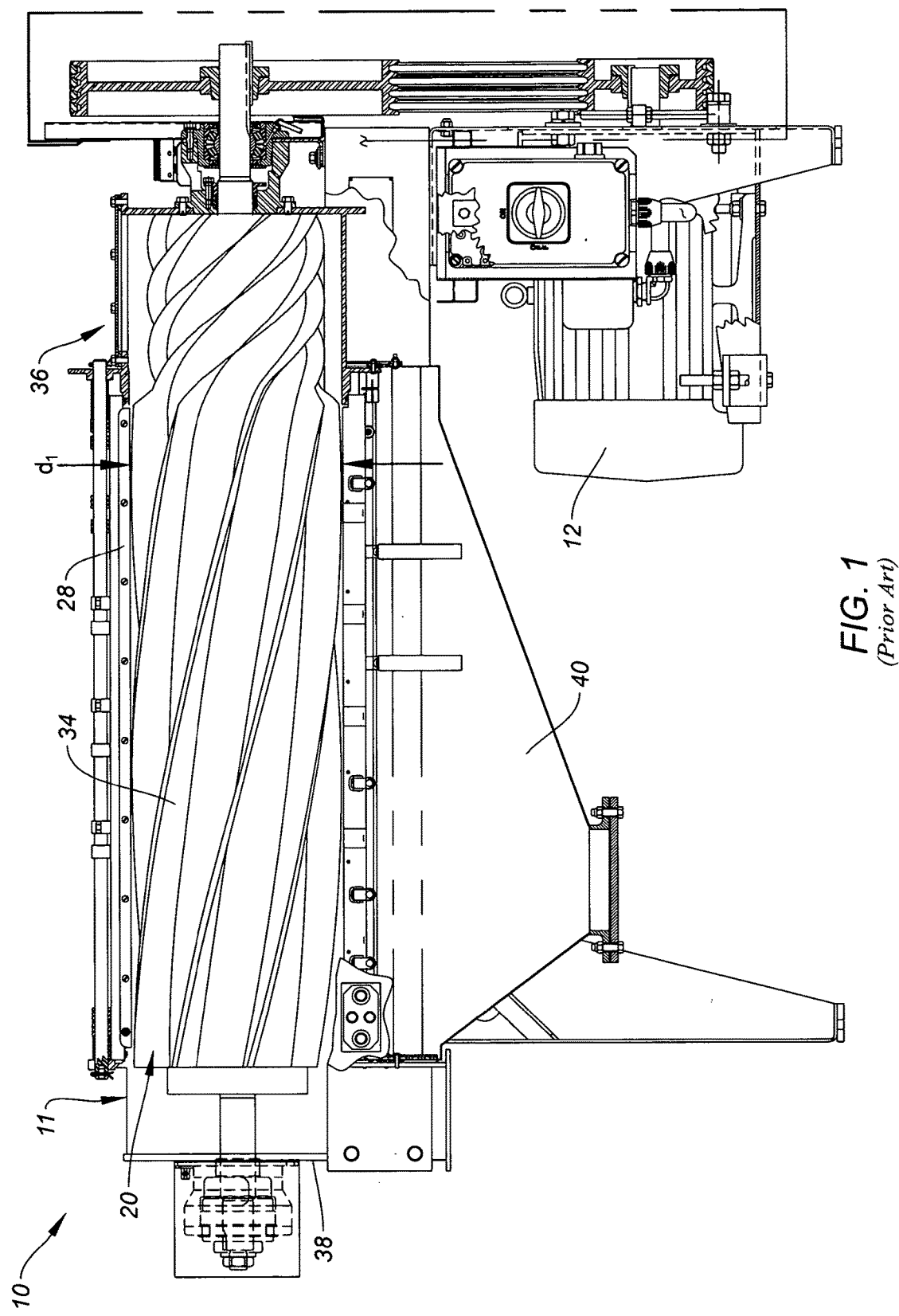
FIG. 1 illustrates a prior art multi-vane finisher.

FIG. 1 is reproduced from U.S. Pat. No. 5,651,305 (incorporated herein by reference) and illustrates a prior art multi-vane finisher 10 to which the improved screen design of the present invention may be applied. A cylindrical screen 28 surrounds the body portion of rotor 20 which carries body vanes 34. Motor 12 drives rotor 20 to cause vanes 34 to urge raw citrus juice through cylindrical screen 28 to separate unwanted solids (or particles) from the raw juice. A housing 11 supports cylindrical screen 28. An open inlet means 36 is provided for introducing raw citrus juice by gravity into the finisher 10. A first outlet means 38 is provided for receiving solids or particles from the inlet end or means 36 of cylindrical screen 28. A second outlet means 40 below cylindrical screen 28 is provided for receiving juice from which some of said solids or particles have been separated. Cylindrical screen 28 has a diameter $d_1$ which usually is between 8 inches (203 mm) and 24 inches (610 mm). The present invention applies to finishers having a cylindrical screen through which raw citrus juice is urged outwardly from the inside of the cylindrical screen to separate solids (also referred to as particles). For example, the present invention may be utilized with paddle finishers as shown in U.S. Pat. No. 4,518,621, which patent is incorporated herein by reference, screw type finishers shown in U.S. Pat. Nos. 3,370,527 and 4,665,816, both of which patents are incorporated herein by reference and any finishers using a cylindrical screen through which raw citrus juice is urged to separate unwanted particles.

Body vanes 34 of the prior art multi-vane finisher 10 are rotated by rotor 20 and comprises means for causing raw citrus juice inside cylindrical screen 28 to be urged in a direction of travel outwardly through screen 28. Body vanes 34 also urge solids toward outlet 38. Similarly, the prior art paddle finisher shown in U.S. Pat. No. 4,518,621, for example, utilizes centrifugal force together with paddles as a means to urge the raw juice outwardly through a cylindrical screen. Prior art screw finishers as shown in U.S. Pat. Nos. 3,370,527 and 4,665,816, for example, utilize a screw or auger as a means for causing raw citrus juice to be urged in a direction of travel outwardly through a cylindrical screen.

As the perforations in prior art finisher screens become smaller, to meet the demand for "thin" juice, the problem of "blinding" has become a serious problem as noted above.

Figure 2A:
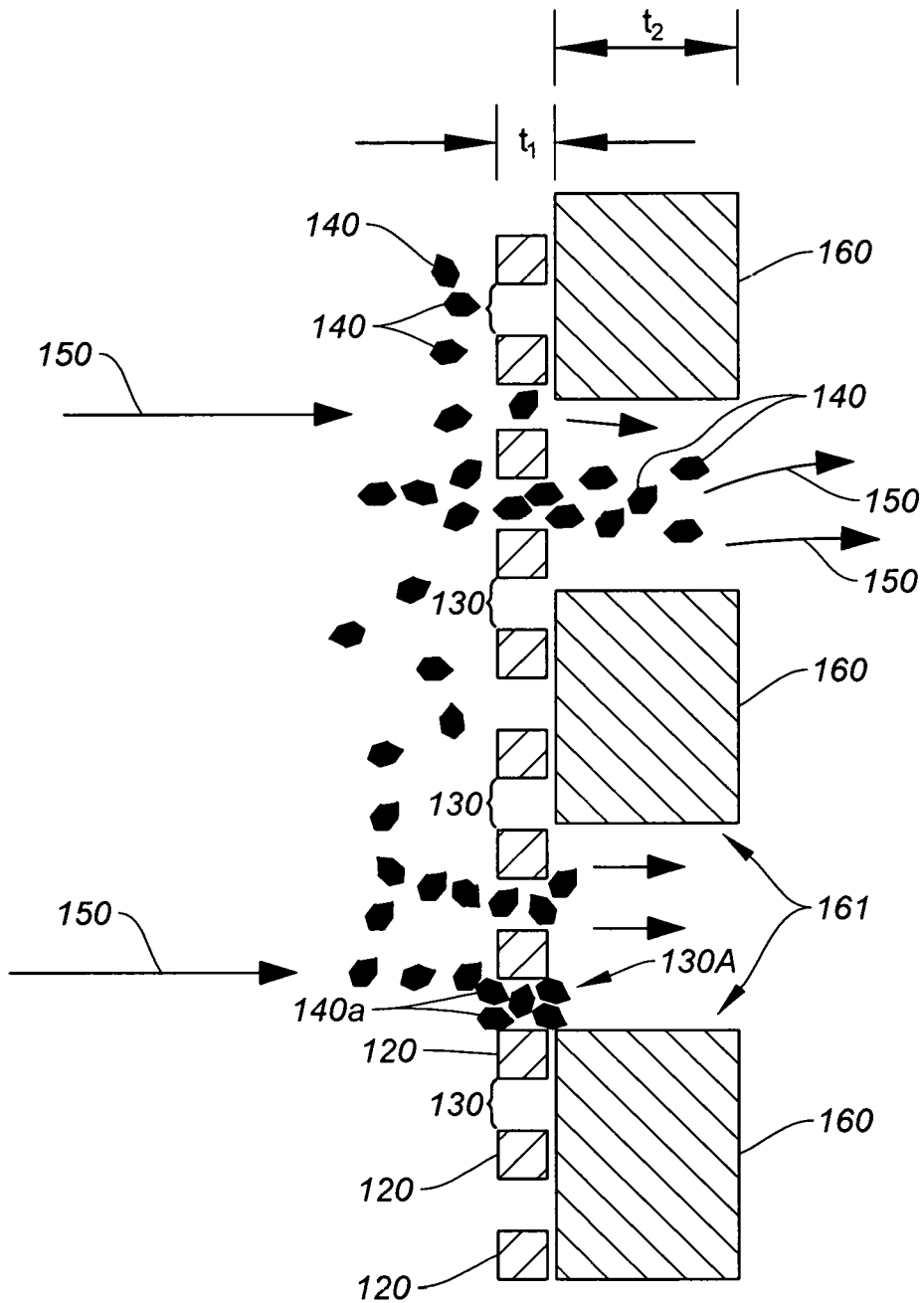
FIGS. 2A and 2B are "concept" sketches which illustrate the prior art problem of screen "blinding;"
Figure 2B:
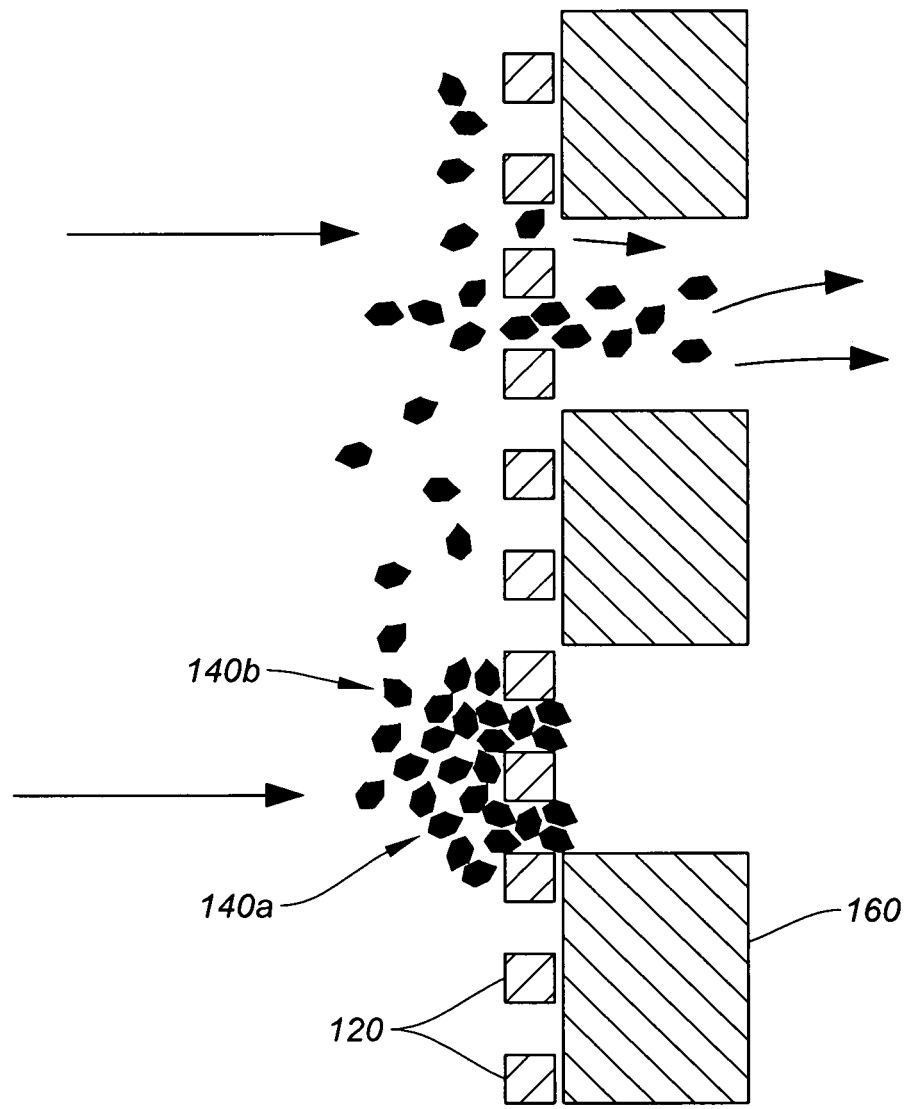

FIGS. 2A-2B are "concept sketches" illustrating the prior art problem of blinding. These sketches also illustrate how prior art secondary support screens restrict flow. The sketches are not to scale and are exaggerated somewhat to illustrate the problem. These sketches are sectional views showing the raw juice 150 flowing through screen 120. Screen 120 has an array of perforations 130 formed therein which are typically cylindrical and extend through screen 120. Solid particles 140 are entrained in juice shown by arrows 150. The prior art perforations 130 known to us have become as small as 400 μm in order to separate as many solids as possible to obtain "thin" citrus juice. In order to produce perforations this small, the prior art has utilized a thin metallic sheet having a thickness $t_1$ of approximately 250 μm. The cylindrical screens made of such thin sheets are unable to maintain a cylindrical shape in operation. The prior art known to us has utilized a support screen 160 to maintain a cylindrical shape of screen 120. Support screen 160 has a thickness $t_2$ of about 1900 μm. The perforations 161 in support screen are about 16,000 μm in diameter, much larger than perforations 130 in screen 120.

As shown in FIG. 2A, juice shown by arrows 150 is being urged outwardly through perforations 130 in screen 120. The particles shown at 140a have adhered to the walls of perforation 130a and are obstructing perforation 130a, beginning the process of "blinding" screen 120.

As shown in FIG. 2B, the particles shown as 140a and 140b have obstructed two perforations of screen 120. This obstruction continues to "blind" sections of screen 120 until the finishing process is shut down to allow back flushing of screen 120, an expensive and time consuming process.

It is significant to note that support screen 160 blocks about 40% of the perforations 130 in screen 120. This obstruction seriously limits the amount of raw juice passing through screen 120, limiting the capacity and efficiency of operation.

Figure 3A:
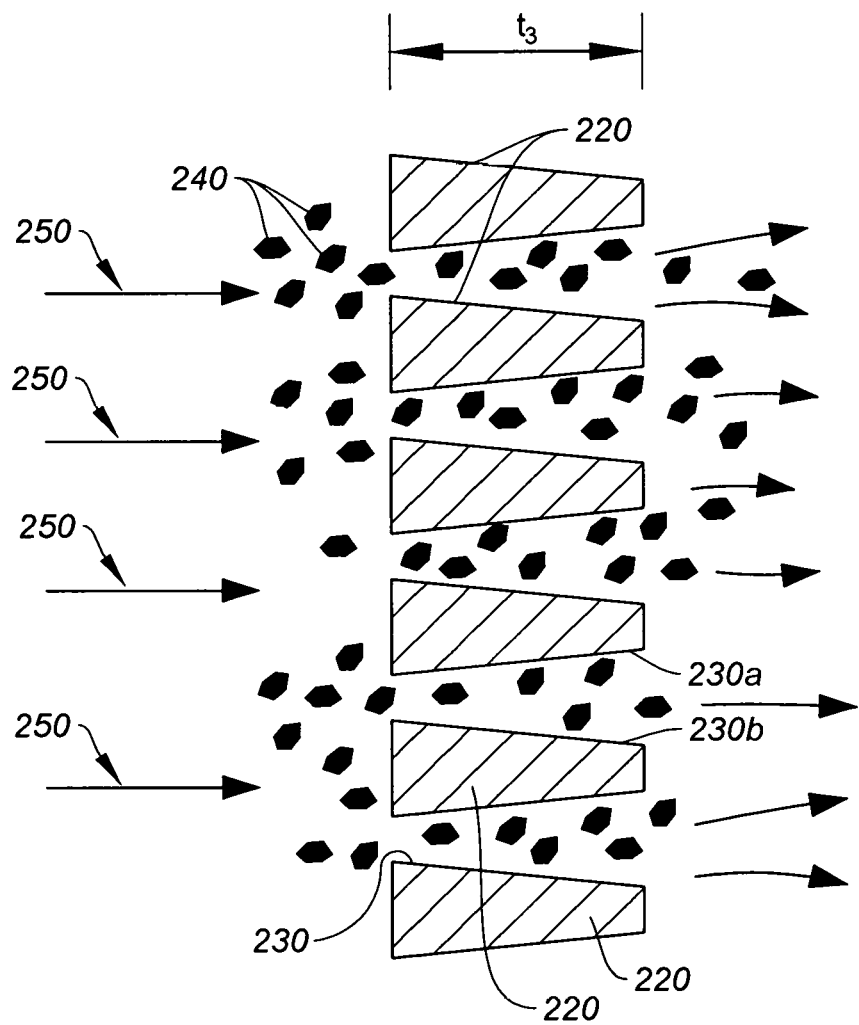
FIGS. 3A, 3B and 3C are "concept" sketches which illustrate the novel screen design solving the problem of screen "blinding;"
Figure 3B:
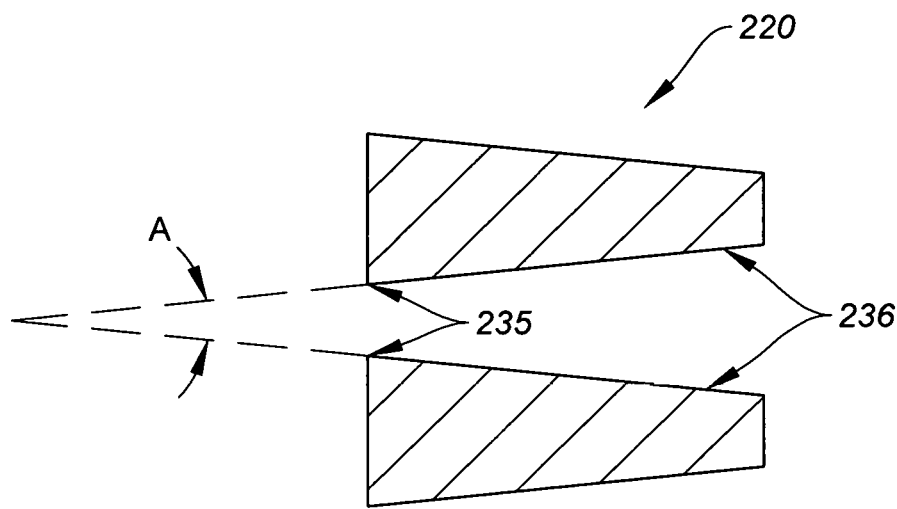
Figure 3C:
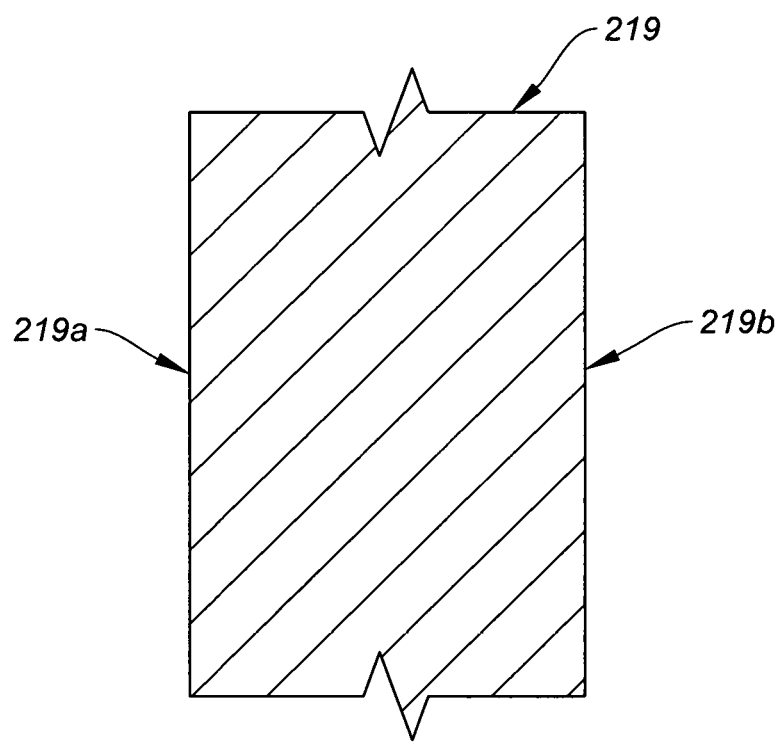

FIGS. 3A-3C are also "concept" sketches illustrating the novel design of screen 220. FIGS. 3A-3C are not to scale and are exaggerated to illustrate the important and novel features. FIGS. 3A-3C are cross-sectional views of a few perforations in screen 220. Screen 220 has a thickness $t_3$ much greater than prior art screen 120; screen 220 is over 1800 mm thick, more than 4 times thicker than prior art screen 120. Thickness $t_3$ may vary with the diameter of the assembled cylindrical screen, from about 1.6 mm to several mm. For example, a cylindrical screen having a diameter of between 8 inches (203 mm) and 24 inches (610 mm) should have a thickness of at least 1.6 mm to retain its cylindrical shape during operation. This increased thickness is sufficient to avoid the need for a support screen 160 to maintain a uniform cylindrical shape of screen 220 while separating solids from the raw juice, which was required by the prior art.

As shown in FIGS. 3A and 3B, the raw citrus juice is shown by arrow 250 being urged outwardly through an array of novel perforations 230 formed in screen 220. Each perforation 230 extends through the screen 220 and has walls 230a and 230b that diverge in the direction of travel of the raw juice outwardly through screen 220 as shown by arrows 250. The diverging walls form an angle "A" between 1° and 5° as shown best in FIG. 3B. The entry orifice 235 of each perforation 230 is preferably circular with a diameter less than 260 μm and an area less than 0.054 mm². The exit orifice 236 of each perforation is at least 20% larger in area than the entry orifice. Perforations 230 are each preferably shaped as a truncated cone with circular orifices or openings at both ends of each perforation, but the openings may be other less preferable shapes, such as oval or hexagonal, for example. The perforations 230 are preferably formed by using a focused electron beam, which allows the use of much thicker metal than used in prior art known to us. Referring to FIG. 3C, a sectional view, screen 220 is formed from a metal or metallic alloy sheet 219 in which an array of perforations 230 (not shown in FIG. 3C) is formed. The perforated sheet is then formed into a cylindrical screen. The sheet has a first side 219a on which the entry orifices are formed and a second side 219b on which the exit orifices are formed. The first side of the sheet forms the inside surface of the cylindrical screen 220. The usable metal includes stainless steel, titanium or other food quality metal. The phrase "food quality metal" refers to any metallic alloy safe enough and strong enough to be utilized in a citrus juice finisher.

As noted above and shown in FIG. 3B, the walls 230a and 230b diverge at an angle from entry orifice 235 to exit orifice 236, wherein angle A is between 1° and 5°. Angle A is sufficiently large to prevent particles 240 from adhering to the walls of perforations 230, thereby preventing blinding of screen 220. The area of the exit orifice 236 is at least 20% greater than the area of entry orifice 235.

Figure 4:
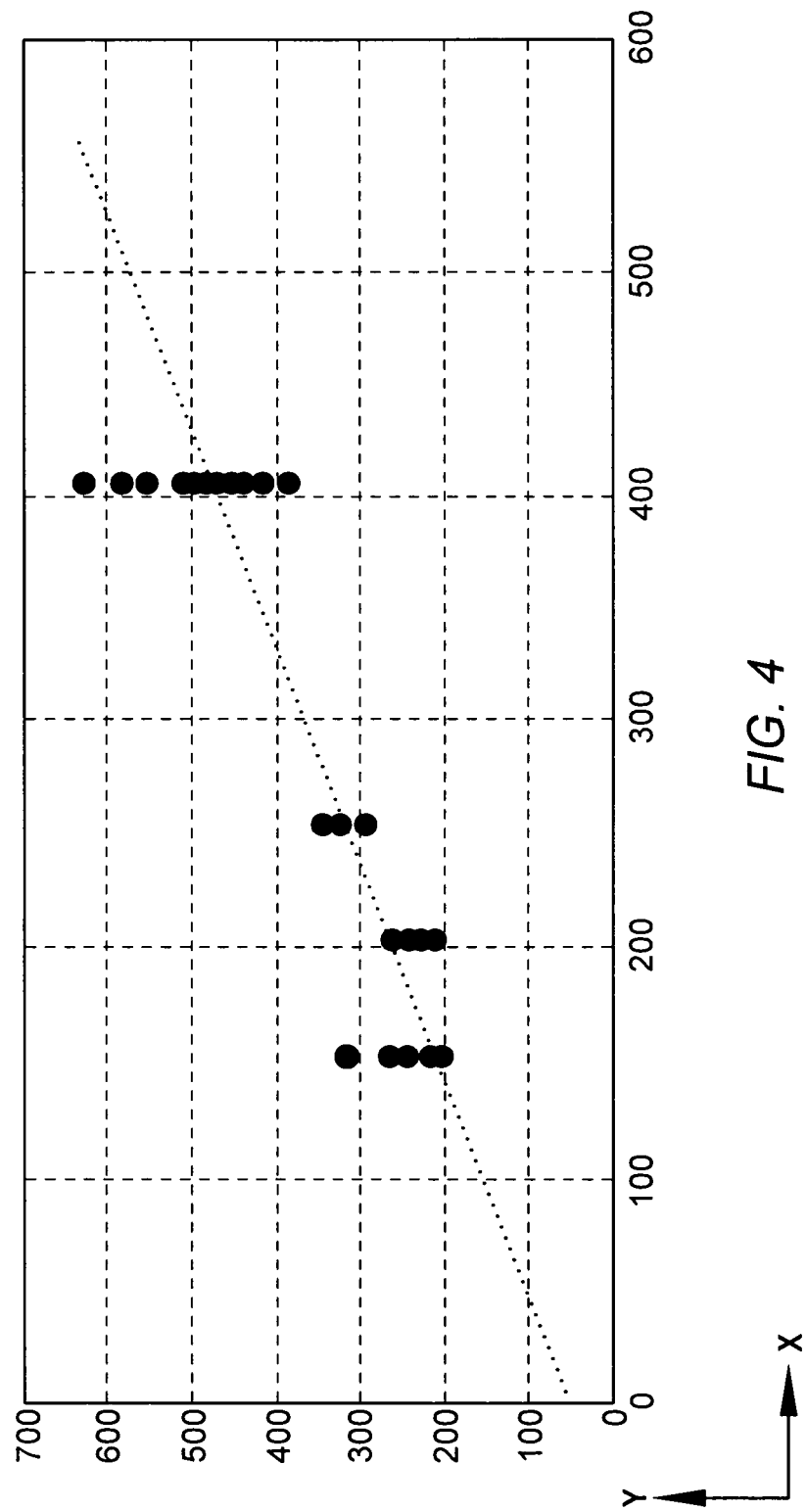
FIG. 4 is a graph representing the relationship of screen perforation size to mean particle size (or diameter)

FIG. 4 illustrates the relationship between the size of circular entry orifices of novel, tapered perforations (in μm) on the inner wall of a cylindrical screen (x axis), and mean particle diameter or size (in μm) on the y axis. This graph represents results of laboratory tests. The results demonstrate that finished "thin" citrus juice having entrained mean particle sizes or diameters less than 360 μm is produced when the entry orifices on the inner surface of the cylindrical screen are circular with less than 260 μm diameters. When the entry orifice size is reduced to 150 μm, the mean particle size or diameter is less than 260 μm. This test was performed using a screw type finisher. Reduction of particle size will be achieved using any type finisher, such as a screw type finisher, multi-vane finisher or centrifugal finisher.

Juice Modulator

Figure 5:
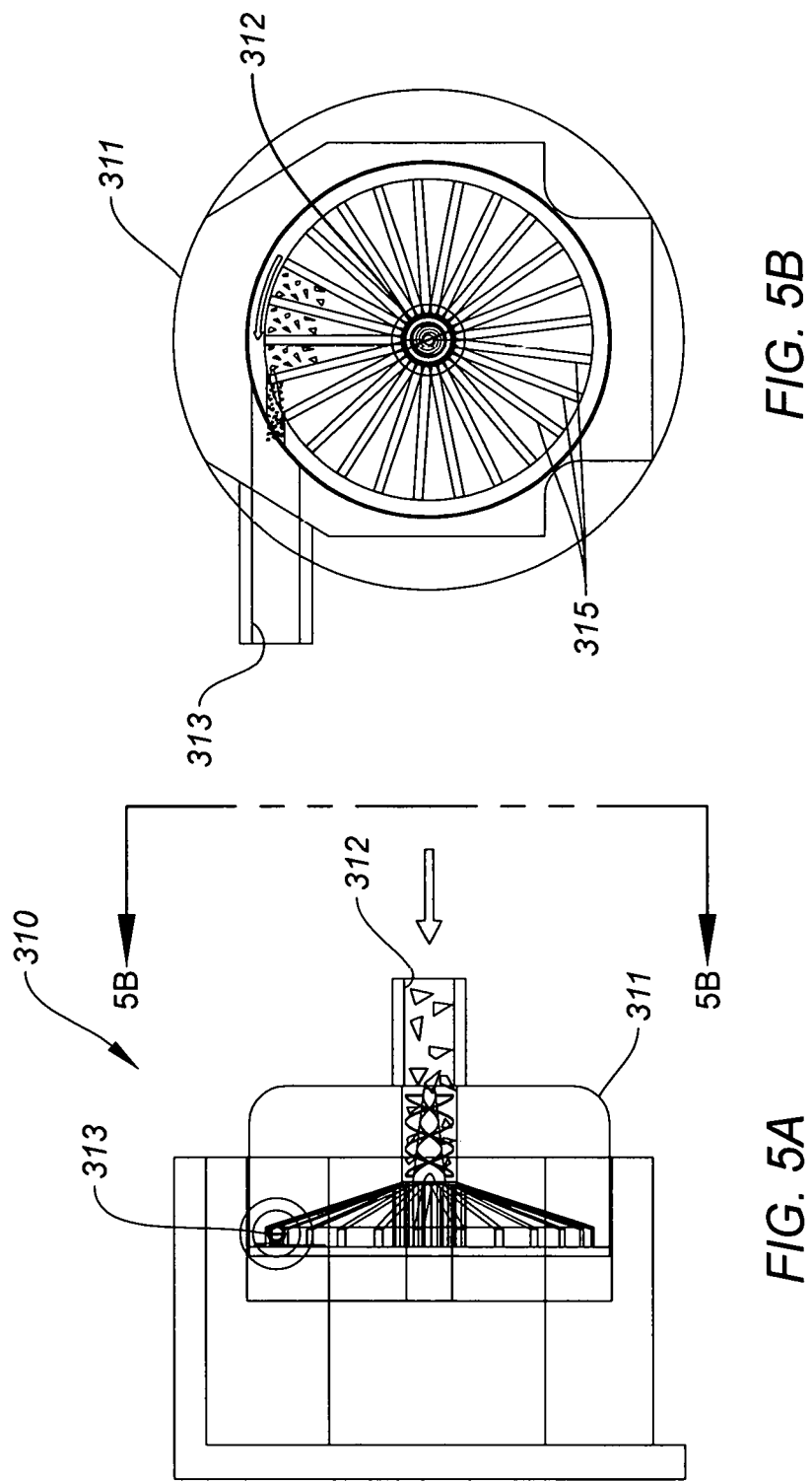
FIGS. 5A and 5B show a controllable, variable speed pump used in the novel modulator design.
Figure 6:
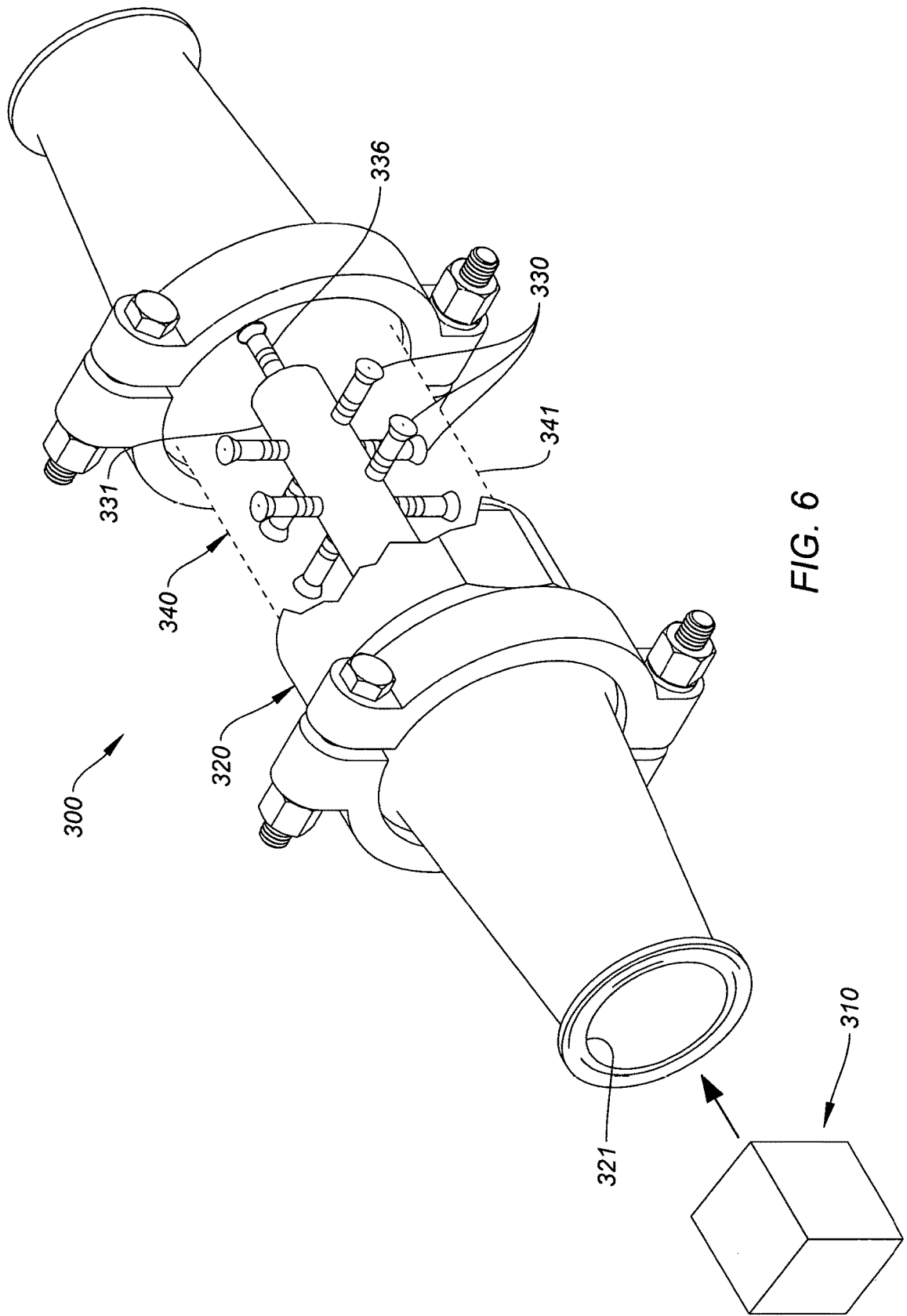
FIG. 6 illustrates the modulator nozzle array and containment tube.

FIGS. 5A, 5B and 6 illustrate the two primary components of an improved juice modulator 300 (FIG. 6). The purpose of the modulator means 300 is to pulverize particles (or solids) to reduce their size. The modulator 300 may be used together with any prior art finisher with any screen design; it can optionally be used together with any finisher using the new screen described above. The modulator 300 includes a pump 310, a housing 320, an array of nozzles 330 on a manifold 331, and a containment wall or tube 340 surrounding the nozzle array 330.

FIGS. 5A and 5B show a controllable, variable speed pump 310 having a pump housing 311, an inlet 312 for finished juice and a juice outlet or discharge 313. A series of radially extending impellers 315 pressurize finished juice up to 600 psi.

FIG. 6 illustrates a modulator means assembly shown generally as 300. Finished juice is pumped by pump means 310 (FIG. 5) into inlet 321 of housing 320. An array of nozzles 330 is mounted on a manifold 331. The nozzle array 330 is positioned inside a containment tube 340. Containment tube 340 is designed to have a containment wall 341 surrounding the nozzle array 330 wherein the surface of containment wall is positioned perpendicular to and within 1-2 mm from the tips of the nozzles in array 330. Nozzle array 330 is preferably mounted on a cylindrical manifold 331 surrounded by a cylindrical containment wall 341.

In operation pump means 310 (FIG. 5) shown schematically in FIG. 6 controllably pressurizes the finished juice to a pressure necessary to cause the velocity of the juice through the nozzles of array 330 to be 30-80 meters per second. The impact of the finished juice against the interior parts of pump means 310, against the surfaces of each nozzle of array 330, and against the containment wall 341 creates shear forces reducing the mean size or diameter of particles or solids entrained in the finished and modulated thin juice to between 240 μm and 280 μm.

Figure 7:
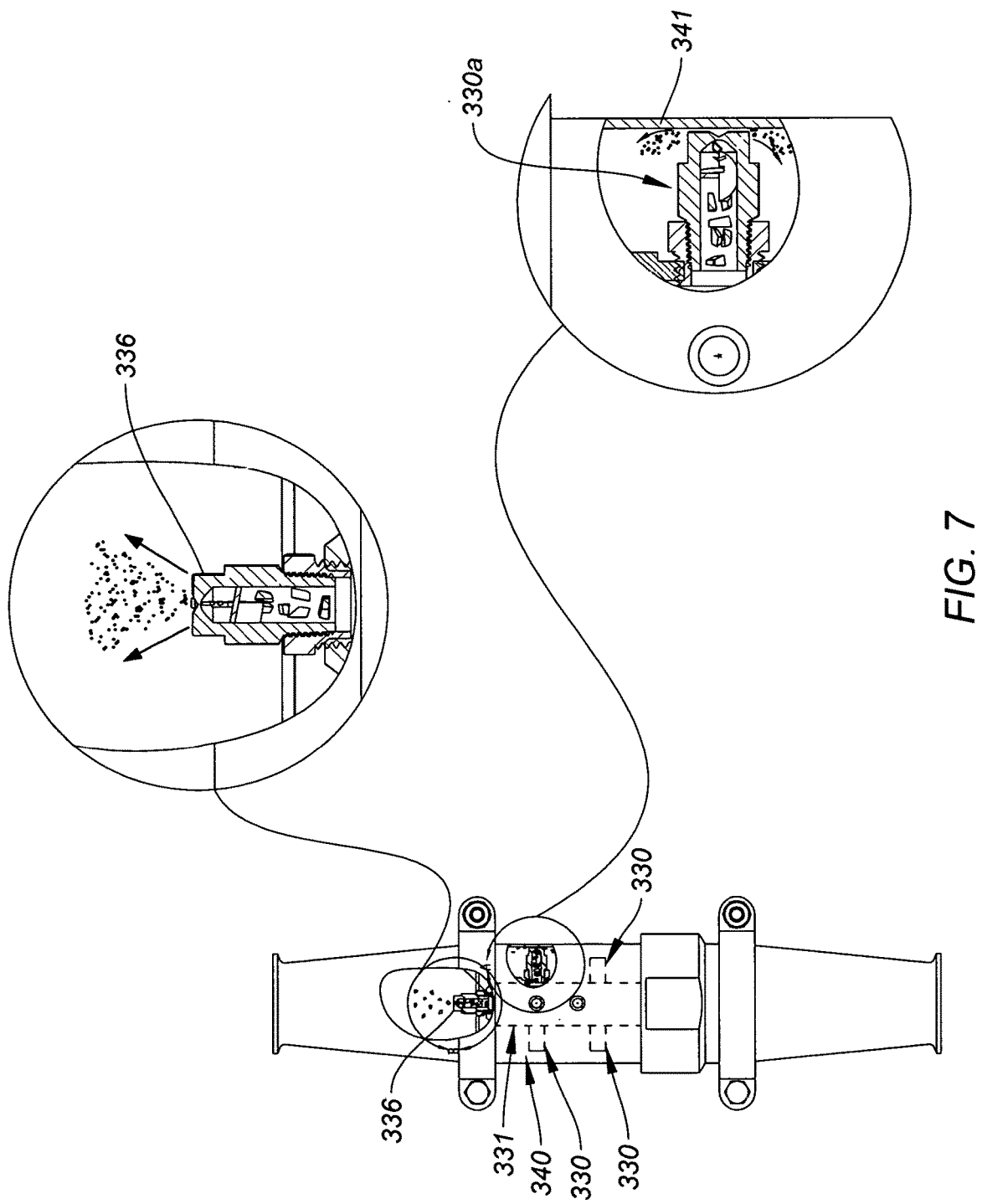
FIG. 7 illustrates in greater detail the modulator nozzle array and containment tube.

FIG. 7 illustrates nozzle array 330 and containment tube 340 in greater detail. Eight nozzles are mounted on cylindrical manifold 331. Containment tube 340 is cylindrical and surrounds the eight nozzles. A ninth optional nozzle 336 is mounted on the distal end of manifold 331. As noted above, the tips of the eight nozzles are positioned very close (within 1-2 mm) to the inner surface of containment tube, as shown by nozzle 330a and containment wall 341, to maximize impact shear forces applied to particles to pulverize and reduce the size of the particles.

Figure 8:
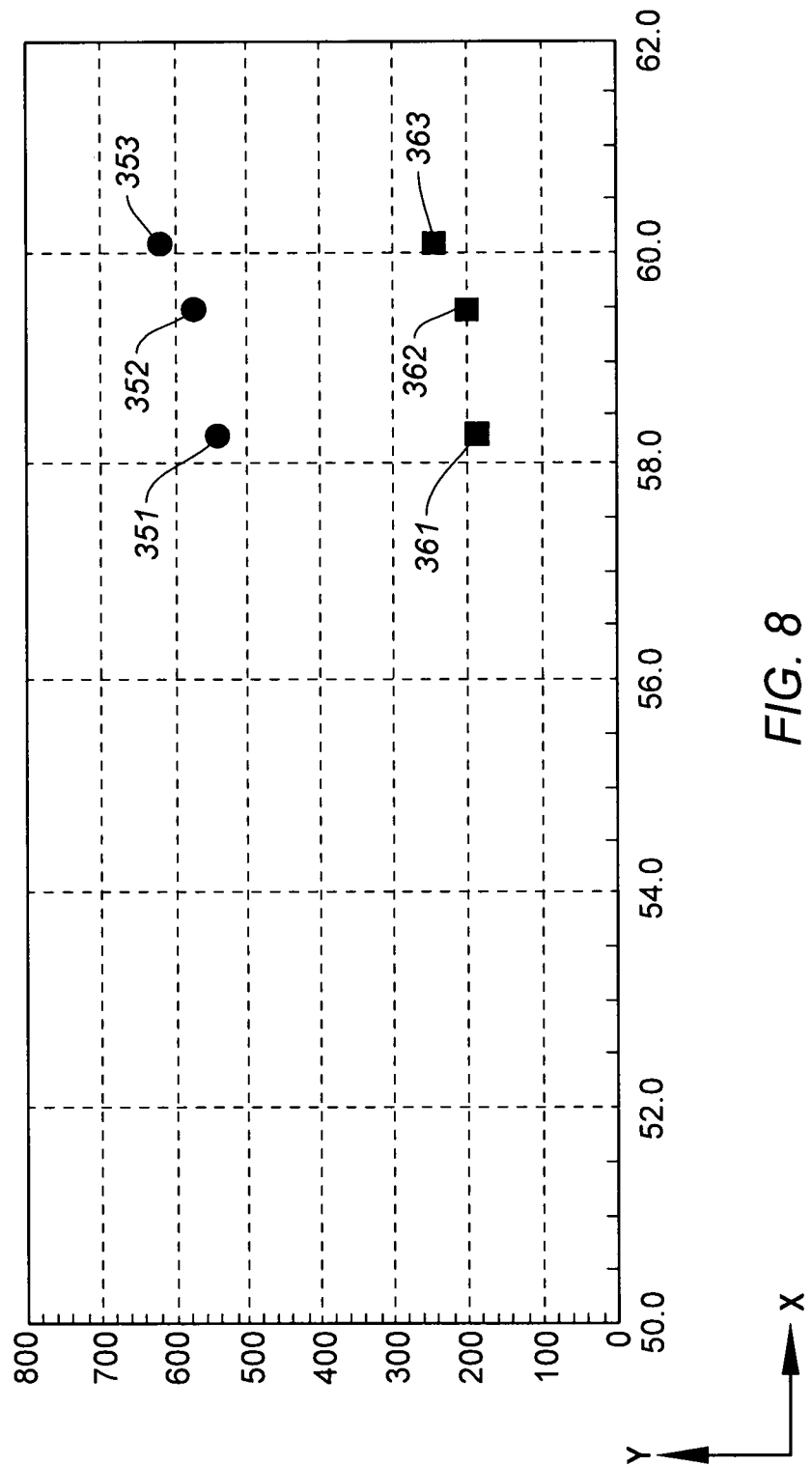
FIG. 8 is a graph showing how the modulator reduces mean particle size when utilized with a prior art finisher.

FIG. 8 graphically illustrates how the modulator assembly of FIGS. 5-7 is capable of significantly reducing mean solid particle sizes or diameters of orange juice finished in a prior art screw finisher with perforations having relatively large openings on the inner surface of the new cylindrical screen 220 of 0.016" (406 μm). The y axis of FIG. 8 is mean particle diameter in microns. The x axis is finished juice percentage of fruit weight. The mean particle diameter or size was reduced from between 540-610 μm as shown at starting points 351, 352 and 353 to less than 240 μm as shown by ending points 361, 362 and 363 after modulation. Similar particle size or diameters will be obtained using the modulator assembly with any prior art finisher. This graph demonstrates that the modulator assembly reduces particle size by more than 60%.

Figure 9:
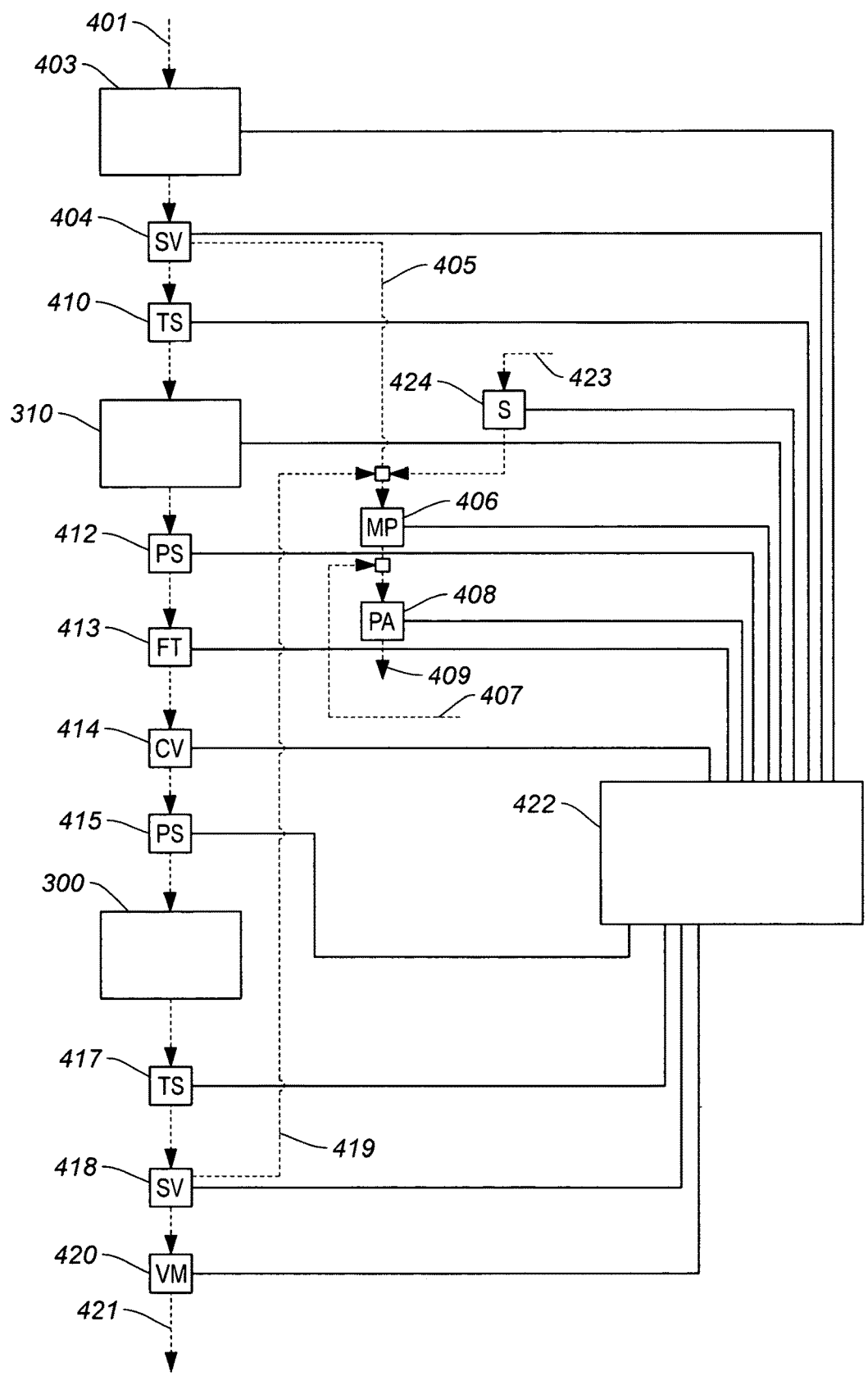
FIG. 9 is a flow chart of the modulator components.

FIG. 9 is a flow chart describing the components of the conditioning and modulating apparatus. The system includes:

A juice tank 403 with pressure transducer for level control −4 to 20 mA signal to PLC (Programmable logic controller) in HMI (Human machine interface) control module, Juice enters tank 403 as shown by arrow 401.

A solenoid valve 404 for sampling juice for in-line particle size analyzer 408 −4 to 20 mA signal from PLC, A juice sample 405 to metering pump line, A sample metering pump 406, A water inlet 407—filtered and mixed at a pre-determined controlled rate with metered juice, A Particle Analyzer 408 is used to monitor particle size of juice samples and control of juice 421 leaving the juice conditioner apparatus. Programming to allow either continuous or intermittently monitoring of a juice sample 405, 419, or 423.

A solenoid valve 424 for sampling reference juice −4 to 20 mA signal from PLC,

An inlet temperature sensor 410 −4 to 20 mA signal to PLC in HMI control module, A modulator feed pump 310; the VFD (Variable frequency drive) controlling pump speed is controlled by a 4-20 mA signal from PLC. Pump speed is regulated to control flow and pressure.

A pressure sensor 412 −4 to 20 mA signal to PLC in HMI control module,

A flow transmitter 413 −4 to 20 mA signal to PLC in HMI control module,

A flow control valve 414 receives 414 4-20 mA from PLC to control product pressure, A pressure sensor 415; −4 to 20 mA signal to PLC in HMI control module, The modulator assembly 300 creates back pressure and applies shear to the juice, A temperature sensor 417 of product after modulator −4 to 20 mA signal to PLC in HMI control module, A solenoid valve 418 for sampling juice for in-line particle size analyzer 408 −4 to 20 mA signal from PLC, A juice sample to metering pump line 419;

A viscometer 420; −4 to 20 mA signal to PLC in HMI control module, Viscometer signal is used to monitor and control product viscosity.

An HMI (Human Machine Interface) Control Module 422 containing— i. Variable Frequency Drive (VFD) for pump speed control modulator feed rate;

ii. Programmable Logic Controller (PLC) with algorithm for regulating pump speed and pressure modulating valve based on flow, temperature, pressure, viscosity and/or particle size.

iii. Graphic Panel (Operator Interface)

Juice from a screw, paddle, or centrifugal type finisher juice finisher, typically equipped with screens to remove pulp cells and other fruit components larger than 800 μm in size, is pumped through an automated ball valve 414 to a pair of juice modulators 300 with nozzles. The pump 310 is responsive to controller 422, is a variable speed pump, and has an impeller tip speed of 60 to 100 meters per second and stainless steel nozzles to accelerate juice to a velocity of 30 to 80 meters per second at a maximum feed pressure of 600 psi. The preferred pump 310 is the Sundyne P-1000 or Sundyne P-2500 for 8 or 17 nozzle manifold, respectively. The preferred nozzles for nozzle array 330 are Spraying Systems Co. Fulljet ⅛ HHSS 3.6 SQ (0.063"/1.6 mm diameter orifice). A tubular metal containment wall surrounds the nozzles which functions to shear pulp particles through high velocity impact against the wall.

The modulator 300 may also include means to sense and control viscosity and particle size of solids entrained in juice exiting the nozzle array 330. An in-line viscometer 420 (FIG. 9) senses and monitors the viscosity of juice exiting nozzle array 330, and a particle analyzer 408 (FIG. 9) senses and monitors the size of solids or particles) entrained in juice exiting nozzle array 330. Control means 422 (FIG. 9) responsive to the viscometer 420 and particle analyzer 408 varies the speed of variable speed pump means 310 (FIG. 9) to achieve and maintain desired viscosity and particle size entrained in the juice. After exiting the juice modulators, the juice passes through an in-line viscometer 420 (Brookfield Model AST-102FTSY 115). A particle analyzer 408 (Malvern Model MPS-SEN-ILE5X12-W) is used to continually or intermittently monitor either the juice prior to entering the pump 310 or after exiting the modulators 300. Temperature of the juice is monitored with temperature sensors just prior to entering the pump 310, immediately after the juice modulators 300, and at the in-line viscometer 420. Pressure is monitored just prior 412 and after 415 the automated valve 414 and flow rate 413 is monitored just prior to the automated valve. With the control system there are four basic modes of operation to control particle size and viscosity reduction as follows:

1. Viscosity set point. Pump speed and automated valves are controlled to increase or decrease the viscosity of product in response to viscosity of juice exiting the modulator 300 detected by an in-line viscometer 420
2. Modulator pressure preset. Pump speed 310 and automated valve are controlled to maintain a preset pressure feed to the modulator.
3. Feed rate set point. Pump speed 310 is controlled to maintain a constant flow rate to the modulator according to the feed rate preset.
4. Particle size set point. Pump speed 310 is controlled to increase or decrease the particle size of product in response to particle diameter of juice as detected by an in-line particle analyzer 408. Juice is sampled either continuously or intermittently from the inlet of the pump 310 or exit of the modulator 300 by means of automated solenoid valves. A metering pump is used to meter the juice into a fixed flow rate of water prior to entering the particle analyzer. Typically the dilution of juice with water entering the particle analyzer is 50 parts water to 1 part juice but can vary 25 to 1 up to 100 to 1 depending on type of juice and quantity of particles in the juice being detected. The control of the pump speed is preferably based on the D4,3 (mean size) value or D90 value from the particle analyzer but is not limited to either of these particular values and may include the D50 (median) or the mode value or an algorithm encompassing a combination of values depending on the desired juice characteristics.

The modulator 300 as illustrated in FIG. 7 consists of an array of nozzles 330 with orifice size ranging in size from 0.1 to 3 mm diameter with preferred diameter of 0.1 to 1.6 mm. The nozzles discharge inside a containment tube 340 in which the inner surface of the tube is in close proximity to the tips of the nozzle. Preferred distance of nozzle tip to tube inner surface is 1 mm, but may be 2 mm. The modulator 300 reduces juice viscosity as well as increases juice cloud stability, as indicated by increase in turbidity units, of citrus juices by reducing the size of suspended particles. Suspended particles (or solids) may include, but not limited to, fragments of juice vesicle epidermis, fragments and organelles of juice vesicle internal cells, juice colloidal/gel particles, and segment wall fragments. Collectively such suspended particles (or solids) are often referred to as sinking or bottom pulp since the volume of the particles are typically measured using a laboratory size centrifuge operated under specific "g-force", time, and temperature conditions. Typically for "finished" juice products without added pulp cells, the suspended pulp particles based on test methods are less than 800 μm in size.

An in-line viscometer detects changes in viscosity as it exits the juice modulator section. It is known that viscosity measurements are affected by both temperature of the juice and shear applied to the juice. Orange juice in particular is known to have "shear thinning" rheological characteristics in that viscosity decreases as shear stress is increased and also decreases as temperature increases. For this reason an algorithm is incorporated in the control logic to compensate for these factors. In addition it is known that shear forces can increase the temperature of the juice and therefore it is important to monitor both the temperature increase (temperature delta) and final juice temperature of the juice during operation and make appropriate adjustments to the operating parameters if necessary. Excessive increases in temperature can be detrimental to both juice flavor and stability.

Figure 10A:
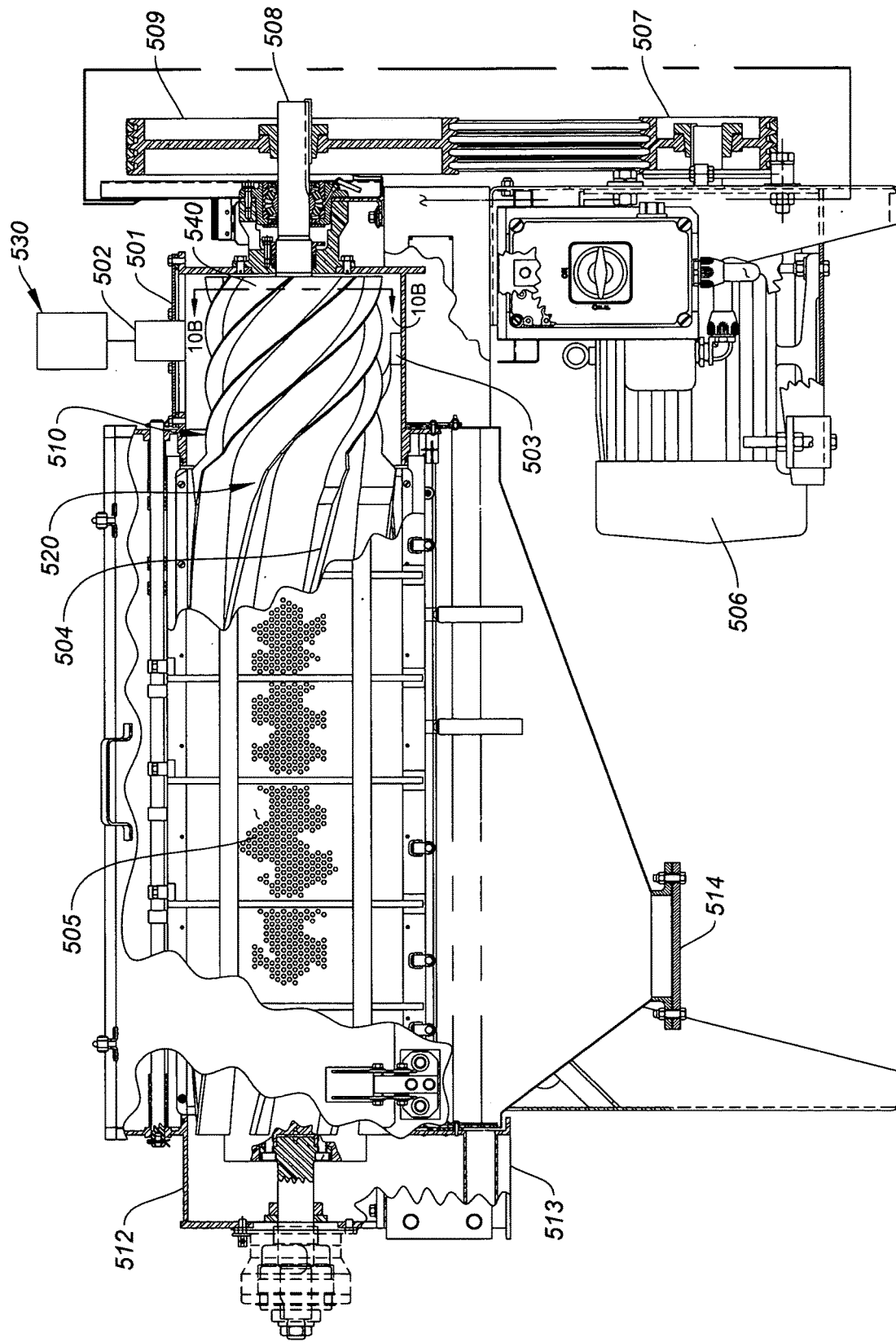
FIGS. 10A and 10B illustrate the improved multi-vane finisher with a novel feed system and rotor design.
Figure 10B:
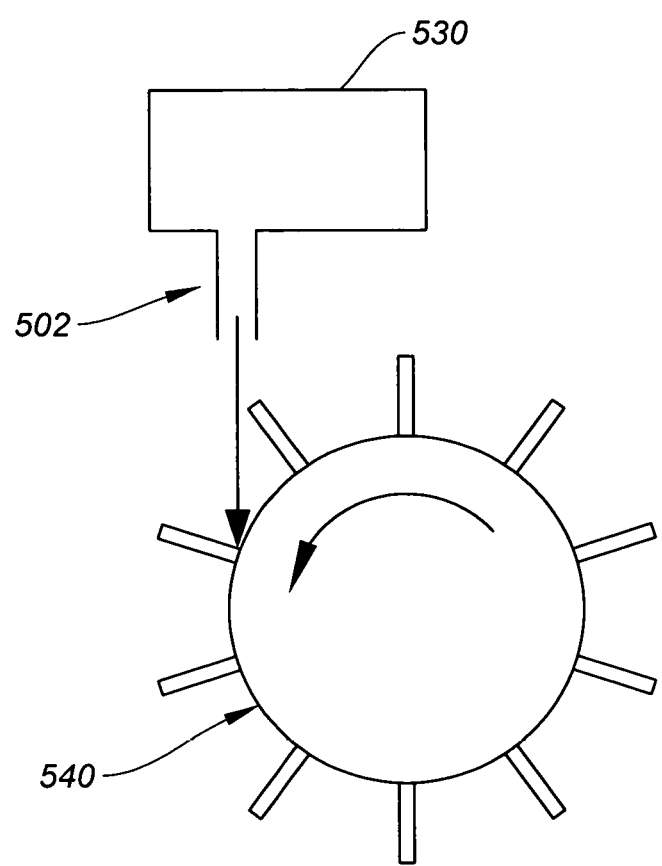

A further aspect of the invention shown in FIGS. 10A-10B is an improvement to a multi-vane food product finisher, as described in U.S. Pat. No. 5,651,305, whereby the improved multi-vane finisher may be utilized as a high efficiency citrus finisher by using thermally drilled metal screens, vane pitch configuration for increased retention of pulp solids, and helical metal strips in the inlet housing along with an unvented closed inlet configuration for force feeding and increased conveyance. With these three elements the multi-vane food finisher is able to achieve high citrus juice yields, increased finishing capacity, and improved juice quality through the reduction of bottom pulp, viscosity, and particle size. This improvement reduces the number of finishers and associated equipment required to recover juice and pulp cells by extending the operating range with respect to pulp dryness (quick fiber), juice particle size, and other juice quality factors. The improvement further reduces the environmental impact of citrus processing with respect to reduced equipment, reduced water usage, reduced electrical energy, and reduced waste disposal such as which occurs with centrifuge sludge discharges.

The food finisher, as described in U.S. Pat. No. 5,651,305 is illustrated in FIG. 10 with the improved elements described above. The finisher includes a motor 506 with a sheave 507 connected to a sheave 509 on the rotor shaft 508 with belts. Housing 512 supports a rotor shown generally as 520. The rotor 520 is comprised of an inlet feed section 510 with pitch angle of approximately 45-degrees and a body section having body vanes 504 in which the vane pitch angle has been reduced to between 1.5 and 3.5 degrees. The body vanes 504 preferably have a constant pitch angle over the length of the rotor body. The body of the finisher is comprised of a stainless steel support structure which allows accurate positioning of the inlet and discharge housing which hold an inlet and discharge bearing as well as accurately positioning a cylindrical screen cage between the housings. The elements of the preferred embodiment of this improvement which are incorporated into the finisher include a closed unvented tightly fitting cover 501 with an inlet tube 502 attached to deliver raw juice downwardly under pressure by pump means 530 with the downward rotation of the rotor, a helical metal strip 503 attached to the inside surface of the inlet housing in order to achieve more positive conveyance of juice and pulp into the body of the finisher, and two semi cylindrical metal screens 505 with thermally drilled perforations (as described above) supported by the screen cage. Juice which is urged outwardly through the screen if funneled out the bottom of the finisher 514 whereas the pulp separated from the juice exits out the discharge end of the finisher 513.

The improved multi-vane finisher preferably utilizes metal alloy screens with round perforations of 150 µm to 254 µm (0.006 inch to 0.010 inch) diameter produced by thermal (electron beam) drilling process for the production of juice with thin characteristics, as described above.

The 0.008 inch (203 µm 505) and 0.006 inch (152 µm not shown in the illustration) thermally drilled screens are very useful in producing low viscosity juice. Although thermally drilled perforation sizes of 0.006 inch to 0.010 inch are the preferred sizes to produce citrus juices with thin characteristics, larger size perforations typically 0.016 (406 µm) inch to 0.024 (609 µm) inch can be used with the finisher for the production of a finished juice product where it is necessary to produce higher viscosity juice products. In addition to a single size perforation on the screen, with the thermally drilled process, screens can be produced with different size perforations along the same screen in order to produce a gradient going from small perforations to large perforations along the axis of the screen.

It was found in the application of finishing citrus juices that the pitch of the body vanes 504 (FIG. 10A) needed to be reduced in order to achieve dry pulp discharges and high juice yields. Whereas a pitch angle of 5 to 10 degrees is recommended on some food products, depending on the ease of separating liquid from the solids, for citrus pulp it was found that a multi-vane rotor with a pitch angle of between 1.5 and 3.5 degree efficiently separated the juice from the pulp. In initial test with a 10-degree rotor the pulp discharge from the finisher ranged in quick fiber value from approximately 210 to 220 ml compared to a paddle finisher with quick fiber ranging from 181 to 183 mi. This resulted in a very high quality juice but finished juice yield about 7% lower than for the paddle finisher and even much lower than typically achieved with a screw finisher. It was found that with a 1.5 to 3.5 degree pitch of the body vanes 504 that quick fiber values could be further reduced to approximately 120 ml when equipped with thermally drilled screens with 0.008 inch (203 µm) perforations and to approximately 85 ml when equipped with 0.016 (406 µm) inch perforations resulting in further finished juice yield increases of approximately 4 and 8%, respectively.

With the 1.5 to 3.5 degree rotor the finisher is generally operated at speeds ranging from 500 to 900 rpm depending on feed rate, screen size and desired pulp dryness. In the case where the pulp needs to have a high juice content, such as required in order to pasteurize the pulp where the pulp cell concentration for example needs to be in the 500 to 900 grams per kilogram range, the speed of the rotor can be further reduced.

In finishing citrus juices, the steep helical configuration of the inlet section of the multi-vane finisher of FIG. 10A does not provide enough positive conveyance of juice and pulp into the finisher to overcome the friction and movement of very pulp along the vanes 504 in the body of the rotor. This limited being able to sustain dry pulp discharges at rotor speeds necessary to achieve high juice yields due to loss of conveyance of the pulp through the finisher and resulted in the back up of juice and pulp and plugging of the finisher. The tendency for the pulp to back up is eliminated by attaching metal helical strips 503 (to the bottom half of the inlet housing and by force feeding the finisher using a positive displacement pump 530 through a closed inlet tube 502. Preferably the inlet tube 502 is located in the feed housing to deliver juice into the finisher tangentially to the cylindrical hub 540 of rotor 520, as shown in FIG. 10B, which is a sectional view looking at the inlet portion of the finisher. With this feed configuration consistent dry pulp discharges, of 85 to 120 ml quick fiber value depending on screen size, can be sustained and the capacity was increased 2 to 3 times higher than normally achieved with a paddle or screw finisher.

The foregoing description of the invention has been presented for purposes of illustration and description and is not intended to be exhaustive or to limit the invention to the precise form disclosed. Modifications and variations are possible in light of the above teaching. The embodiments were chosen and described to best explain the principles of the invention and its practical application to thereby enable others skilled in the art to best use the invention in various embodiments suited to the particular use contemplated.

The invention claimed is:

1. A citrus raw juice finisher for removing solid particles from the raw juice to produce a finished thin juice, comprising
a housing
a cylindrical screen mounted in said housing
inlet means for introducing said raw juice into one end of said cylindrical screen,
first outlet means for receiving said solids from said inlet means of said cylindrical screen,
second outlet means for receiving said juice from which some of said solid particles have been separated,
means for causing said raw citrus juice inside said cylindrical screen to be urged in a direction of travel outwardly through said screen,
wherein said cylindrical screen is formed from a metallic sheet having a thickness equal to or greater than 1.6 mm and wherein said sheet has an array of perforations formed therein, each of said perforations extending through said sheet and having walls which diverge in said direction of travel of said raw juice through said screen, each of said perforations having an entry orifice on the inside of said cylindrical screen with an area less than 0.054 mm$^2$ and a second, larger exit orifice on the outer surface of said cylindrical screen, having an area more than 20% larger than said area of said entry orifice whereby said divergent perforations prevent blinding thereof by said solid particles, and whereby the thickness of said cylindrical screen is sufficient to avoid the need for a support screen to maintain a uniform cylindrical shape in operation, wherein said finished thin juice has entrained solid particles having mean particle sizes less than 360 μm, whereby said mean particle sizes of less than 360 urn are obtained without the use of a homogenizer or centrifuge, and whereby the cost of said finisher is reduced by avoiding the cost of a homogenizer or centrifuge.

2. The finisher of claim 1 wherein said entry orifices of said perforations on said inner surface are circular with a diameter less than 260 μm and wherein said perforations have a truncated, conical shape.

3. The finisher of claim 2 wherein said diverging walls form an angle between 1° and 5°.

4. The finisher of claim 2 wherein said diameter of said cylindrical screen is between 8 inches (203 mm) and 24 inches (610 mm).

5. The finisher of claim 1 wherein said entry orifices of said perforations on said inner surface have diameters of 160 μm or less and wherein said finished thin juice has entrained solids having mean particle diameters less than 260 μm.

6. The apparatus of claim 1 further comprising particle analyzer means for monitoring particle size entrained in samples of said finished juice.

7. The apparatus of claim 1 further comprising finished juice modulator means for adjusting the viscosity and entrained mean particle size of said finished juice.

8. The apparatus of claim 7 wherein said finished juice modulator means comprises:
   pump means capable of pressurizing said finished juice up to 600 psi,
   an array of nozzles through which said finished juice is pumped by said pump means at velocities of 30-80 meters per second, and
   a containment wall surrounding said array of nozzles wherein the surface of said wall is positioned between 1-2 mm from the tips of said nozzles
   whereby the impact of said finished juice against the interior parts of said pump mean, against the surfaces of said nozzles, and against said containment wall creates shear forces reducing the mean size of particles entrained in the finished and modulated thin juice to between 240 μm to 280 μm.

9. The apparatus of claim 8 further comprising:
   sensing means for monitoring the viscosity of and particle size of solids in juice exiting said nozzles
   control means responsive to said sensing means for varying the speed of said pump means to maintain desired viscosity of and particle size entrained in said juice.

10. The apparatus of claim 1 wherein said metal alloy used to form said cylindrical screen is stainless steel.

11. The apparatus of claim 1 wherein said cylindrical screen is made of a food grade material.

12. The apparatus of claim 1 wherein said means for urging said raw juice through said cylindrical screen is a paddle finisher.

13. The apparatus of claim 1 wherein said means for urging said raw juice through said cylindrical screen is a mulli-vane finisher.

14. The apparatus of claim 1 wherein said means for urging said raw juice through said cylindrical screen is a screw finisher.

15. A citrus raw juice finisher having a housing, a rotor rotatably supporting on the housing, a cylindrical screen surrounding the portion of said rotor, wherein said rotor has a rotor inlet section and a rotor body section, said rotor inlet section has a plurality of inlet vanes extending at a first pitch angle, said rotor body section having a plurality of body vanes extending at a second pitch angle, characterized by:
   said body vane having a pitch angle of between 1.5° and 3.5°,
   said rotor inlet section being closed and having an inlet tube, and
   pump means for forcibly feeding said raw juice under pressure downwardly through said inlet tube into said rotor inlet section
   whereby dry pump discharges of 85 to 120 ml quick fiber value are achieved wherein said cylindrical screen is metallic, has a thickness equal or greater than 1.6 mm, has an array of perforations extending through said screen, said perforations having walls which diverge in the direction of flow of said juice through said screen, said perforations having entry orifices on the inside of said cylindrical screen having an area of less than 0.054 mm$^2$, whereby mean particle sizes of less than 360 μm are obtained without the use of a homogenizer or centrifuge and whereby the cost of said finisher is reduced by avoiding the cost of a homogenizer or centrifuge.

16. The finisher of claim 15 wherein helical metallic strips are carried by the bottom of said rotor inlet section, whereby said strips help maintain pressure of the raw citrus juice to assist the transfer of juice to said rotor body section.

17. The finisher of claim 15 wherein said rotor inlet section has a cylindrical hub on which said rotor inlet vanes are carried, and wherein said raw juice is fed tangentially to the surface of said cylindrical hub.

* * * * *